(12) United States Patent
Sugita et al.

(10) Patent No.: US 11,710,947 B2
(45) Date of Patent: Jul. 25, 2023

(54) SPARK PLUG FOR INTERNAL COMBUSTION ENGINE

(71) Applicant: DENSO CORPORATION, Kariya (JP)

(72) Inventors: Keisuke Sugita, Nisshin (JP); Shota Kinoshita, Nisshin (JP); Akimitsu Sugiura, Kariya (JP); Daisuke Shimamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/075,073

(22) Filed: Dec. 5, 2022

(65) Prior Publication Data
US 2023/0103156 A1    Mar. 30, 2023

Related U.S. Application Data

(63) Continuation of application No. PCT/JP2021/020826, filed on Jun. 1, 2021.

(30) Foreign Application Priority Data

Jun. 9, 2020 (JP) .................................. 2020-100407

(51) Int. Cl.
*H01T 13/54* (2006.01)
(52) U.S. Cl.
CPC .................. *H01T 13/54* (2013.01)

(58) Field of Classification Search
CPC ..................................................... H01T 13/54
USPC ............................................................ 313/143
See application file for complete search history.

(56) References Cited

U.S. PATENT DOCUMENTS

2016/0079739 A1*  3/2016  Okazaki .................. H01T 13/54
                                                                313/143

FOREIGN PATENT DOCUMENTS

| DE | 102021204955 A1 * | 11/2022 |
| DE | 102021206662 A1 * | 12/2022 |
| JP | 2016-95986 | 5/2016 |
| JP | 2016072104 A * | 5/2016 |
| JP | 2020-9747 | 1/2020 |

* cited by examiner

*Primary Examiner* — Christopher M Raabe
(74) *Attorney, Agent, or Firm* — Nixon & Vanderhye P.C.

(57) ABSTRACT

A spark plug includes: a cylindrical insulator; a center electrode that is held on an inner circumferential side of the insulator and includes a tip-end protruding portion that protrudes from the insulator toward a tip end side; a cylindrical housing that holds the insulator on an inner circumferential side; and a plug cover that is provided in a tip end portion of the housing so as to cover a pre-combustion chamber in which the tip-end protruding portion is arranged. The plug cover is provided with an injection hole that communicates the pre-combustion chamber to the outside. A positioning portion that performs positioning of the housing and the plug cover in a plug circumferential direction is provided in the housing and the plug cover.

11 Claims, 19 Drawing Sheets

74
(44)

74
(44)

SPARK PLUG FOR INTERNAL COMBUSTION ENGINE

CROSS-REFERENCE TO RELATED APPLICATION

The present application is a continuation application of International Application No. PCT/JP2021/020826, filed on Jun. 1, 2021, which claims priority to Japanese Patent Application No. 2020-100407, filed on Jun. 9, 2020. The contents of these applications are incorporated herein by reference in their entirety.

BACKGROUND

Technical Field

The present disclosure relates to a spark plug for an internal combustion engine.

Related Art

There are spark plugs which have a plug cover provided in a tip end portion of a housing to form a pre-combustion chamber. In the plug cover, an injection hole that communicates the pre-combustion chamber to the outside is formed. A flame that is ignited in the pre-combustion chamber is injected from the injection hole into a main combustion chamber, and combustion thereby spreads through the main combustion chamber.

SUMMARY

One aspect of the present disclosure is a spark plug for an internal combustion engine including: a cylindrical insulator; a center electrode that is held on an inner circumferential side of the insulator and includes a tip-end protruding portion that protrudes from the insulator toward a tip end side; a cylindrical housing that holds the insulator on an inner circumferential side; and a plug cover that is provided in a tip end portion of the housing so as to cover a pre-combustion chamber in which the tip-end protruding portion is arranged, in which the plug cover is provided with an injection hole that communicates the pre-combustion chamber to the outside, and a positioning portion that performs positioning of the housing and the plug cover in a plug circumferential direction is provided in the housing and the plug cover.

DESCRIPTION OF THE EMBODIMENTS

Figure 1:
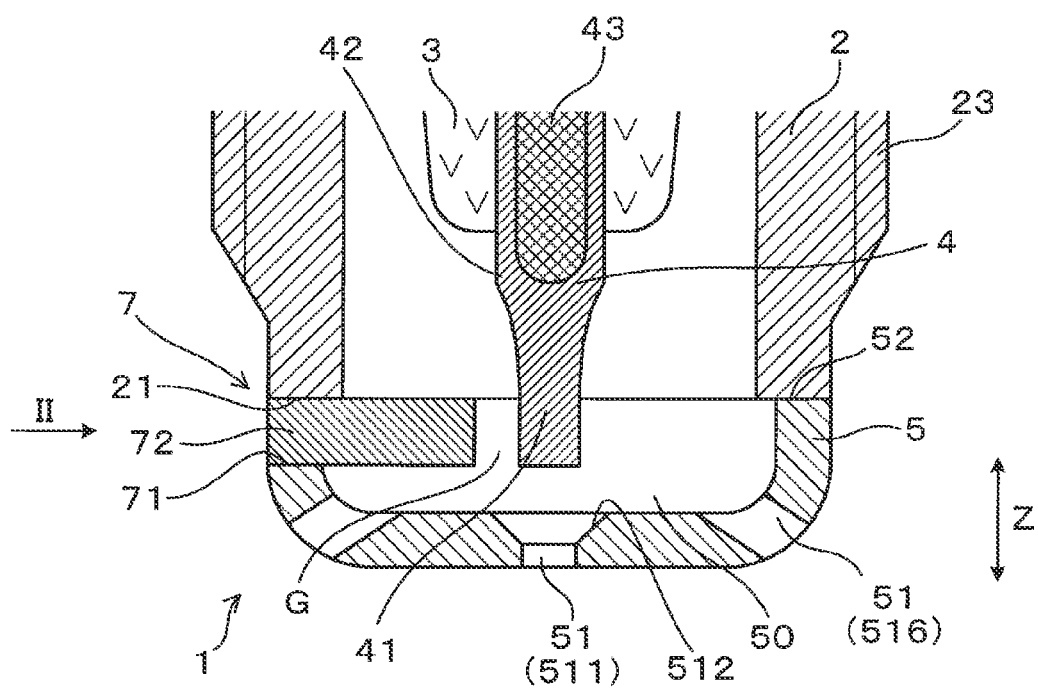
FIG. 1 is a cross-sectional view of a region around a tip end portion of a spark plug according to a first embodiment, taken along an axial direction.

There are spark plugs which have a plug cover provided in a tip end portion of a housing to form a pre-combustion chamber. An injection hole that communicates the pre-combustion chamber to the outside is formed in the plug cover. A flame that is ignited in the pre-combustion chamber is injected from the injection hole into a main combustion chamber, and combustion thereby spreads through the main combustion chamber. Here, when the flame that is injected from the injection hole comes into contact with a piston or a cylinder head, heat is dissipated and heat loss occurs. To prevent this heat loss, JP-A-2020-009747 discloses a technology that prescribes a direction of a center axis of the injection hole to be a predetermined direction.

No consideration regarding an orientation of the injection hole in a plug circumferential direction is given in the spark plug disclosed in JP-A-2020-009747.

An injection direction of a flame jet relative to the main combustion chamber when viewed from an advancing/retreating direction of the piston may affect a manner in which combustion spreads in the main combustion chamber. Therefore, there is room for improvement in combustion speed in the main combustion chamber and room for improvement in fuel efficiency in the spark plug in which consideration is not given to the orientation of the injection hole in the plug circumferential direction.

It is thus desired to provide a spark plug for an internal combustion engine that is capable of obtaining improvement in fuel efficiency.

One aspect of the present disclosure is a spark plug for an internal combustion engine including: a cylindrical insulator; a center electrode that is held on an inner circumferential side of the insulator and includes a tip-end protruding portion that protrudes from the insulator toward a tip end side; a cylindrical housing that holds the insulator on an inner circumferential side; and a plug cover that is provided in a tip end portion of the housing so as to cover a pre-combustion chamber in which the tip-end protruding portion is arranged, in which the plug cover is provided with an injection hole that communicates the pre-combustion chamber to the outside, and a positioning portion that performs positioning of the housing and the plug cover in a plug circumferential direction is provided in the housing and the plug cover.

In the above-described spark plug for an internal combustion engine, the positioning portion is provided in the housing and the plug cover. As a result, a position in the plug circumferential direction of the injection hole that is provided in the plug cover relative to the housing can be determined. Therefore, if an attachment attitude of the housing relative to the internal combustion engine is a predetermined attachment attitude, an orientation of the injection hole relative to a main combustion chamber in the plug circumferential direction can be directed to a desired orientation. Consequently, an orientation of a flame jet that is injected from the injection hole can be controlled to a desired orientation relative to the main combustion chamber, and improvement in fuel efficiency can be obtained.

As described above, according to the above-described exemplary embodiment, a spark plug for an internal combustion engine that is capable of obtaining improvement in fuel efficiency can be provided.

The above-described exemplary embodiment of the present disclosure will be further clarified through the detailed description below, with reference to the accompanying drawings.

First Embodiment

An embodiment of a spark plug for an internal combustion engine will be described with reference to FIG. 1 to FIG. 7.

Figure 2:
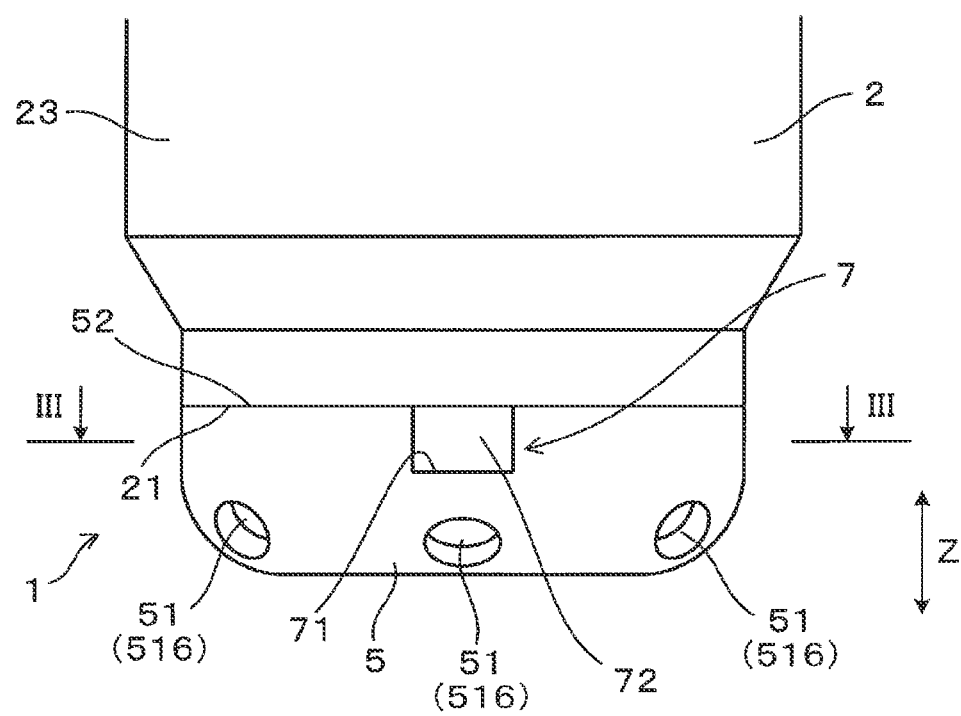
FIG. 2 is a view as viewed from an arrow II in FIG. 1.

As shown in FIG. 1 and FIG. 2, a spark plug 1 for an internal combustion engine according to the present embodiment includes a cylindrical insulator 3, a center electrode 4, a cylindrical housing 2, and a plug cover 5.

The center electrode 4 is held on an inner circumferential side of the insulator 3. In addition, the center electrode 4 includes a tip-end protruding portion 41 that protrudes from the insulator 3 toward a tip end side. The housing 2 holds the insulator 3 on an inner circumferential side. The plug cover 5 is provided in a tip end portion of the housing 2 so as to cover a pre-combustion chamber 50 in which the tip-end protruding portion 41 is arranged.

Figure 3:
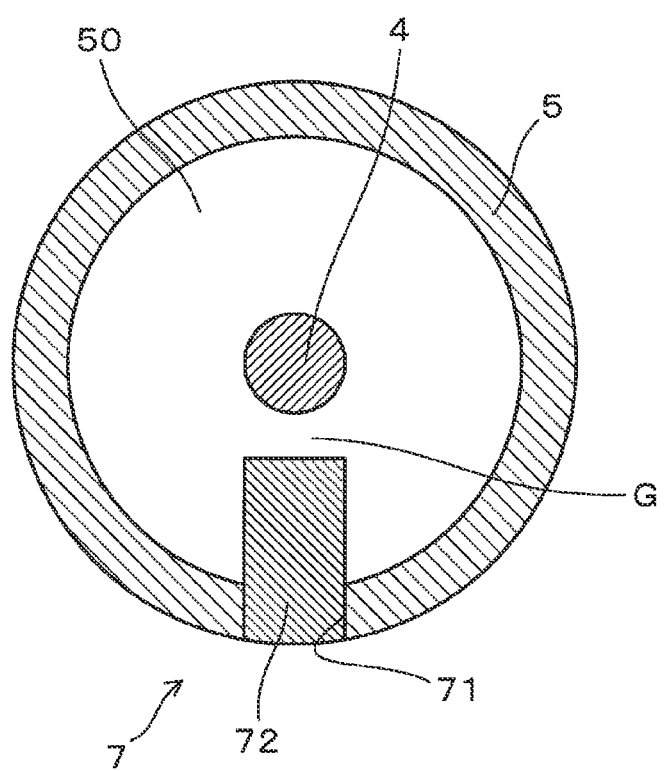
FIG. 3 is a cross-sectional view as viewed from arrows in FIG. 2.

An injection hole 51 that communicates the pre-combustion chamber 50 to the outside is provided in the plug cover 5. As shown in FIG. 1 to FIG. 3, a positioning portion 7 that performs positioning of the housing 2 and the plug cover 5 in a plug circumferential direction is provided in the housing 2 and the plug cover 5.

The positioning portion 7 is configured by a fitting recessing portion 71 and a joining member 72 being fitted together. The fitting recessing portion 71 is provided in at least either of the tip end portion of the housing 2 and a base end portion of the plug cover 5. The joining member 72 is joined to a component, of the housing 2 and the plug cover 5, on a side opposite a component to which the fitting recessing portion 71 is provided.

According to the present embodiment, as shown in FIG. 1, FIG. 2, FIG. 5, and FIG. 7, the fitting recessing portion 71 is provided in the base end portion of the plug cover 5. In addition, as shown in FIG. 1, FIG. 2, FIG. 5, and FIG. 6, the joining member 72 is joined to the tip end portion of the housing 2.

Furthermore, the joining member 72 is a member that configures a ground electrode. That is, as shown in FIG. 1 and FIG. 3, an end portion of the joining member 72 on a side opposite a side that is joined to the housing 2 is arranged so as to oppose the center electrode 4. In addition, a discharge gap G is formed between the joining member 72 that serves as the ground electrode and the center electrode 4.

Figure 4:
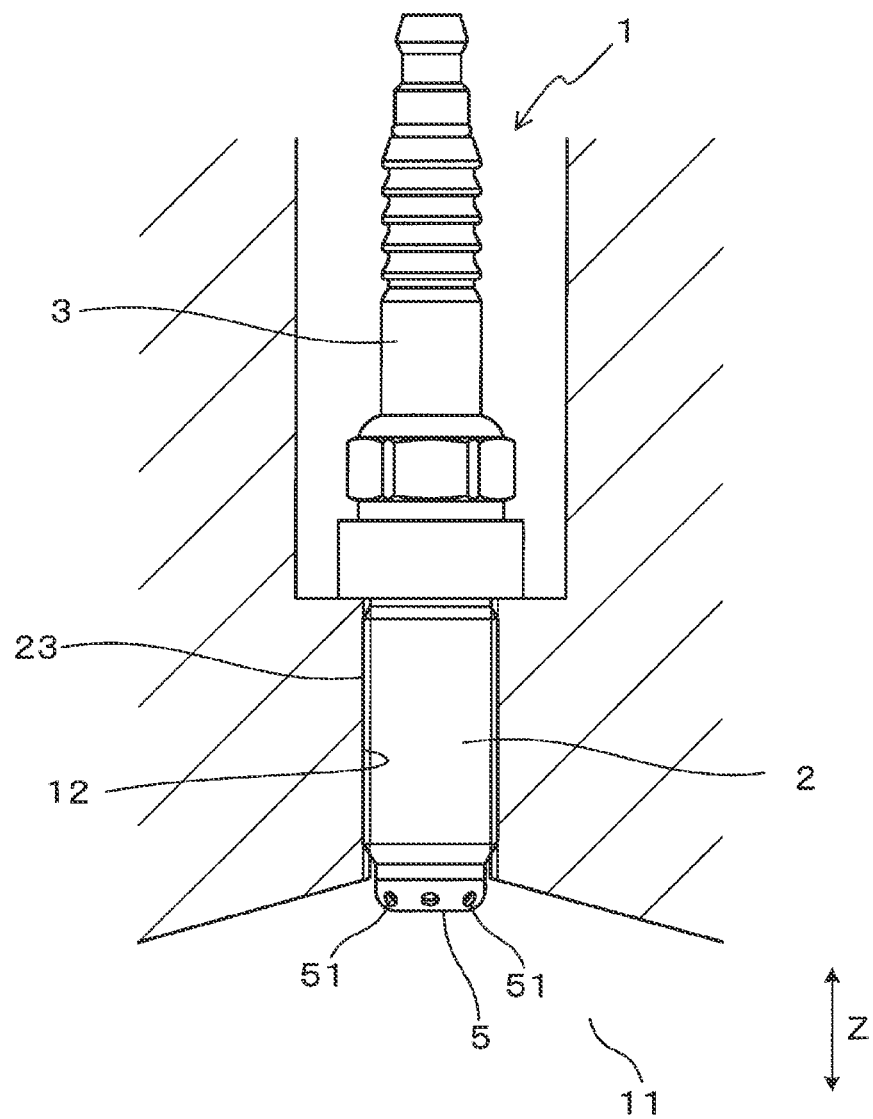
FIG. 4 is a front view of the spark plug attached to an internal combustion engine according to the first embodiment.

For example, the spark plug 1 according to the present embodiment can be used as an ignition means in an internal combustion engine for an automobile, cogeneration, and the like. In addition, as shown in FIG. 4, one end in an axial direction Z of the spark plug 1 is arranged in a combustion chamber of the internal combustion engine. The combustion chamber of the internal combustion engine is referred to as a "main combustion chamber 11" relative to the above-described "pre-combustion chamber 50." A side in the axial direction Z of the spark plug 1 that is exposed to the main combustion chamber 11 is referred to as a tip end side and a side opposite the tip end side is referred to as a base end side. In addition, a center axis of the spark plug 1 along the axial direction Z is referred to as a plug center axis. A circumferential direction of a circle around the plug center axis is referred to as a plug circumferential direction.

The plug cover 5 is joined to the tip end portion of the housing 2 by welding or the like. In a state in which the spark plug 1 is attached to the internal combustion engine, the plug cover 5 segments the pre-combustion chamber 50 from the main combustion chamber 11. As shown in FIG. 1 and FIG. 2, according to the present embodiment, a plurality of injection holes 51 are formed in the plug cover 5. A flame that is generated in the pre-combustion chamber 50 is injected from the injection holes 51 into the main combustion chamber 11.

According to the present embodiment, the plug cover 5 includes a single axial-direction injection hole 511 and a plurality of side injection holes 516 as the injection holes 51. The side injection holes 516 are formed on an outer circumferential side of the axial-direction injection hole 511 and are tilted further toward the outer circumferential side, toward the tip end side. According to the present embodiment, six side injection holes 516 are provided and are formed at even intervals in the plug circumferential direction.

The axial-direction injection hole 511 is open in the axial direction Z. The axial-direction injection hole 511 is formed in a position that overlaps the center electrode 4 in the axial direction Z. The axial-direction injection hole 511 has a chamfered portion 512 on an opening end on the pre-combustion chamber 50 side. The chamfered portion 512 is formed into a tapered shape such that the axial-direction injection hole 511 increases in diameter toward the base end side.

The joining member 72 is joined to a tip end surface of the housing 2. In addition, the joining member 72 protrudes toward a tip end portion of the center electrode 4 from the housing 2. The ground electrode that is also the joining member 72 opposes an outer circumferential surface of the tip-end protruding portion 41 of the center electrode 4 from the outer circumferential side. As a result, the discharge gap G is formed on the outer circumferential side of the tip-end protruding portion 41 of the center electrode 4.

For example, the plug cover 5 and the joining member 72 can be made of a nickel-based alloy or the like. For example, the housing 2 can be made of low-carbon steel or the like. In addition, the center electrode 4 includes a base material 42 that is made of a metal or an alloy that has excellent heat resistance, and a core material 43 that is made of a metal or an alloy that has excellent heat conductivity that is arranged on an inner side of the base material 42. For example, the base material 42 is made of a nickel-based alloy. For example, the core material 43 is made of copper or a copper alloy.

As shown in FIG. 1 and FIG. 4, the housing 2 has an attachment screw portion 23 on an outer circumferential surface. As shown in FIG. 4, the spark plug 1 is attached to the internal combustion engine by the attachment screw portion 23 being screwed to a female screw portion of a plug hole 12 that is provided in an engine head or the like of the internal combustion engine. The spark plug 1 is attached to the internal combustion engine in a state in which a portion on the tip end side is exposed to the main combustion chamber 11.

An attachment attitude of the spark plug 1 relative to the plug hole 12 in the plug circumferential direction is determined by a manner in which the attachment screw portion 23 is cut and a manner in which the female screw portion 23 of the plug hole 12 is cut. The attachment screw portion 23 is configured by a screw thread and a screw groove that are formed in a helical shape on the outer circumferential surface of the housing 2. In addition, the attachment attitude of the spark plug 1 relative to the plug hole 12 is determined by a position in the plug circumferential direction of end portions of the screw thread and the screw groove on the tip end side of the spark plug 1. That is, the attitude in the plug circumferential direction of the spark plug 1 relative to the main combustion chamber 11 is determined. A reason for this is that, when the spark plug 1 is attached to the plug hole 12, the attachment screw portion 23 is screwed to the female screw of the plug hole 12 at a predetermined fastening torque.

Therefore, the positioning portion 7 is provided in the housing 2 and the plug cover 5 such that the injection hole 51 is arranged in a predetermined position in the plug circumferential direction with reference to the attachment screw portion 23. As a result, when the spark plug 1 is attached to the plug hole 12 in the attachment screw portion 23 of the housing 2, positions and orientations in the plug circumferential direction of the injection holes 51 (particularly the side injection holes 516) that are provided in the plug cover 5 are predetermined positions and orientations relative to the main combustion chamber 11.

Figure 5:
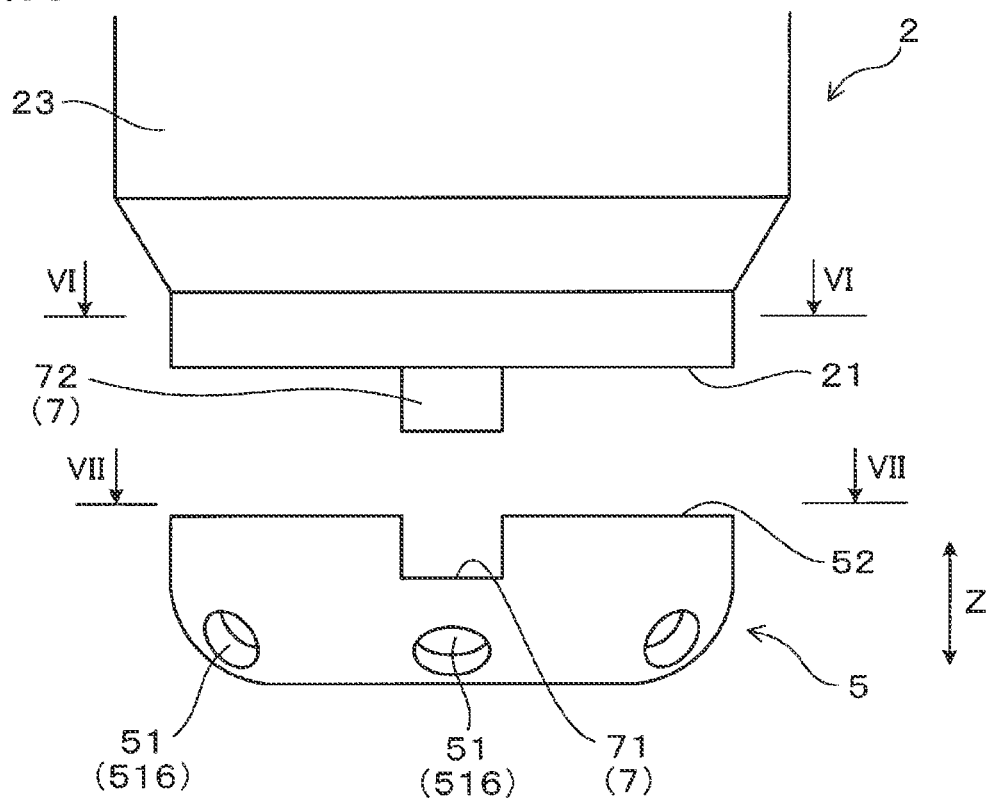
FIG. 5 is a front view of a housing and a plug cover before joining according to the first embodiment.
Figure 6:
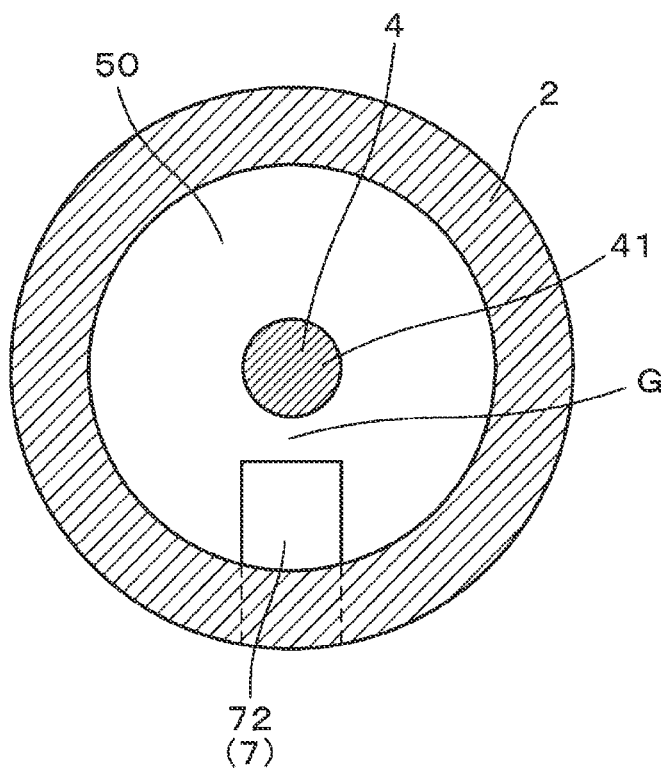
FIG. 6 is a cross-sectional view as viewed from arrows VI-VI in FIG. 5.

According to the present embodiment, in assembly of the spark plug 1, as shown in FIG. 5 and FIG. 6, the joining member 72 is joined to a tip end surface 21 of the housing 2 before the plug cover 5 is fixed to the housing 2. For example, joining of the joining member 72 to the housing 2 can be performed by resistance welding, laser welding, or the like.

Figure 7:
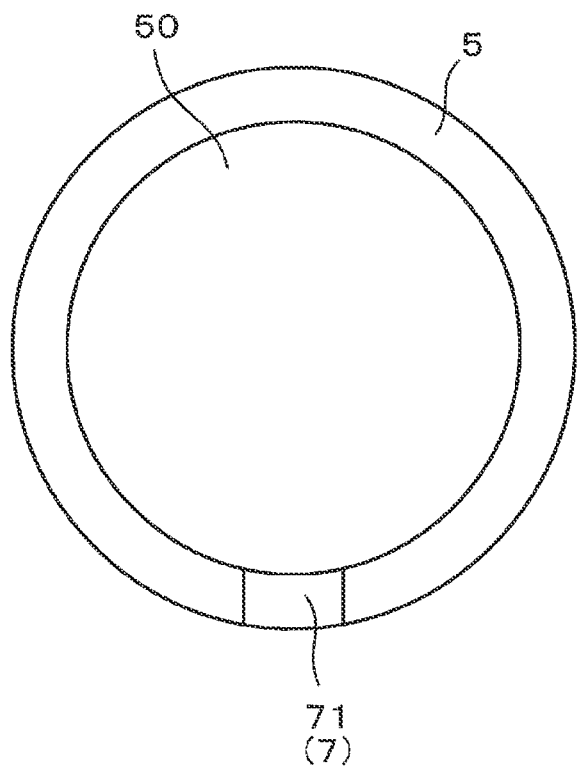
FIG. 7 is a view as viewed from arrows VII-VII in FIG. 5.

Meanwhile, as shown in FIG. 5 and FIG. 7, the fitting recessing portion 71 is formed in the base end portion of the plug cover 5. For example, the fitting recessing portion 71 is formed by cutting or the like. The fitting recessing portion 71 is open toward the base end side and open toward both sides in the plug radial direction. Here, the plug radial direction is a direction that is orthogonal to the plug center axis.

In addition, as shown in FIG. 2 and FIG. 3, a base end surface 52 of the plug cover 5 is placed in contact with the tip end surface 21 of the housing 2. At this time, an overall circumference of the base end surface 52 of the plug cover 5, excluding a portion in which the fitting recessing portion 71 is formed, is placed in contact with the tip end surface 21 of the housing 2. Then, the fitting recessing portion 71 is fitted to the joining member 72. In this state, contact portions between the base end portion of the plug cover 5 and the tip end portion of the housing 2 are joined by welding or the like. Furthermore, the joining member 72 and an inner surface of the fitting recessing portion 71 can also be joined.

The plug cover 5 is attached to the housing 2 in this manner, and thus a relative positional relationship between the housing 2 and the plug cover 5 in the plug circumferential direction is determined to be a predetermined positional relationship. That is, if the positioning portion 7 is not present, that is, if the fitting recessing portion 71 and the joining member 72 are not present, attachment is performed with the positional relationship in the plug circumferential direction of the plug cover 5 relative to the housing 2 being an arbitrary positional relationship. In contrast, the positioning portion 7 (that is, the fitting recessing portion 71 and the joining member 72) is provided, and thus the housing 2 and the plug cover 5 can be accurately fixed in the positional relationship that is prescribed in advance.

Next, working effects according to the present embodiment will be described.

In the above-described spark plug 1 for an internal combustion engine, the positioning portion 7 is provided in the housing 2 and the plug cover 5. As a result, the positions in the plug circumferential direction of the injection holes 51 that are provided in the plug cover 5 relative to the housing 2 can be determined. Therefore, if the attachment attitude of the housing 2 relative to the internal combustion engine is a predetermined attachment attitude, the orientations in the plug circumferential direction of the injection holes 51 relative to the main combustion chamber 11 can be directed to the desired orientations. Consequently, an orientation of a flame jet that is injected from the injection hole 51 can be controlled to a desired orientation relation to the main combustion chamber 11.

Improvement in fuel efficiency can be obtained.

Appropriate control of the orientations of the injection holes 51 relative to the main combustion chamber 11 leads to improvement in fuel efficiency. This mechanism will be described below.

As described above, an injection direction of the flame jet relative to the main combustion chamber 11 when viewed from an advancing/retreating direction of a piston may affect a manner in which combustion spreads in the main combustion chamber 11. As one factor thereof, a shape of the main combustion chamber 11 can be given. That is, the shape of the main combustion chamber 11 is not necessarily a uniform rotor shape with the plug center axis as the center.

Figure 8:
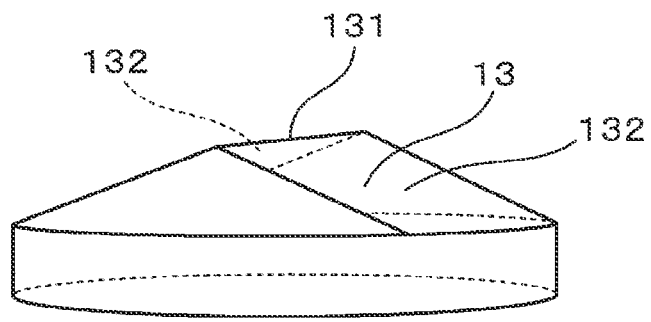
FIG. 8 is a perspective view of an overall shape of a ceiling surface of a main combustion chamber according to the first embodiment.
Figure 9:
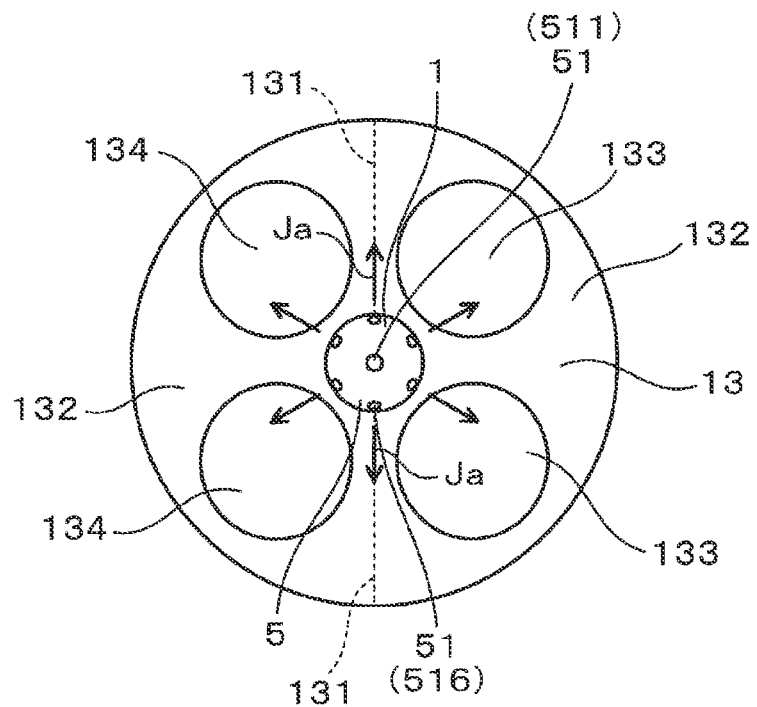
FIG. 9 is a plan view of the main combustion chamber according to the first embodiment viewed from a tip end side, and an explanatory diagram of a state in an attitude A.

Here, as shown in FIG. 8, a case in which a ceiling surface 13 on a side opposite the piston in the main combustion chamber 11 has a so-called pent-roof shape is assumed. In this case, for example, as shown in FIG. 9, on two sloped surfaces that are mutually sloped with a ridge 131 of the pent-roof-shaped ceiling surface 13 therebetween, two intake openings 133 and two discharge openings 134 are formed. The spark plug 1 is attached on the ridge 131 in a position that is surrounded by the intake openings 133 and the discharge openings 134.

Here, as shown in FIG. 9, a portion of the injection holes 51 is arranged to be oriented along the ridge 131, and thus the orientations of flame jets Ja that are injected therefrom are along the ridge 131. In this case, at least these flame jets Ja do not easily strike the ceiling surface 13 of the main combustion chamber 11 and can be said to easily spread through the main combustion chamber 11. Therefore, combustion speed in the main combustion chamber 11 can be increased. The attachment attitude of the spark plug 1 shown in FIG. 9 is referred to, hereafter, as an attitude A.

Figure 10:
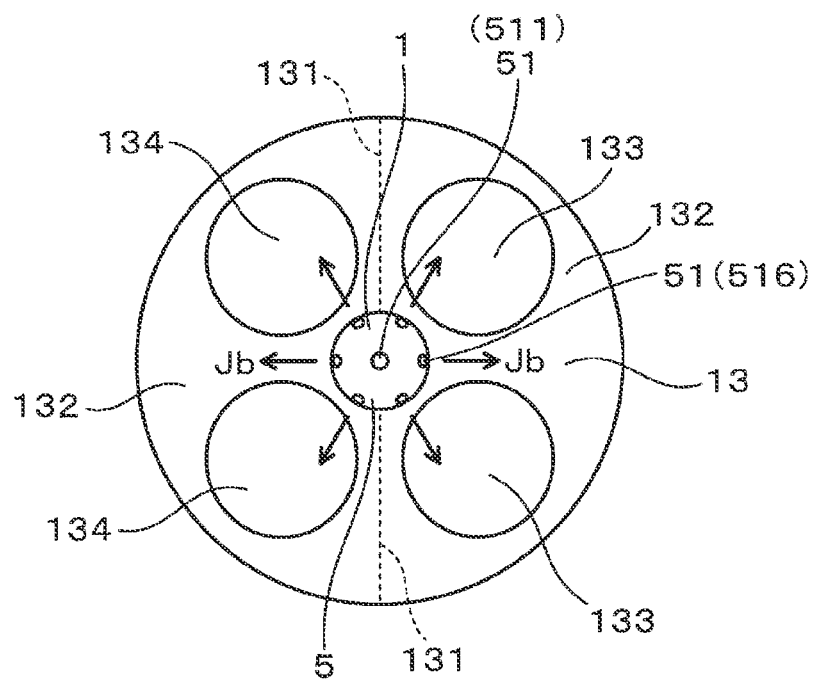
FIG. 10 is a plan view of the main combustion chamber according to the first embodiment viewed from the tip end side, and an explanatory diagram of a state in an attitude B.

Meanwhile, as shown in FIG. 10, when the spark plug 1 is attached to the internal combustion engine in a state in which the injection holes 51 are not arranged to be oriented along the ridge 131, a flame jet along the ridge 131 is not obtained. Therefore, flame jets Jb easily strike the ceiling surface 13 and the combustion speed in the main combustion chamber 11 is difficult to increase. The attachment attitude of the spark plug 1 shown in FIG. 10 is referred to, hereafter, as an attitude B.

Therefore, it is thought that combustion speed can be increased and improvement in fuel efficiency can be obtained as a result of the attitude A being taken instead of the attitude B.

Tests were conducted in the above-described attitudes A and B, by the internal combustion engine being actually operated under conditions that correspond to a rotation frequency of 2000 rpm and a torque of 280 Nm. In the tests, an extent of proximity of a timing of a combustion mass ratio of 50% (referred to, hereafter, as an "MFB (mass fraction burned) 50% timing") to an upper dead point of the piston during combustion by after top dead center (ATDC) ignition was compared. In general, knocking more easily occurs as a center of gravity of combustion advances. However, fuel efficiency improves if knocking can be suppressed and the center of gravity of combustion can be advanced to a desired position. Therefore, the MFB 50% timing being able to be advanced while knocking is suppressed is preferable from the perspective of fuel efficiency.

Figure 11:
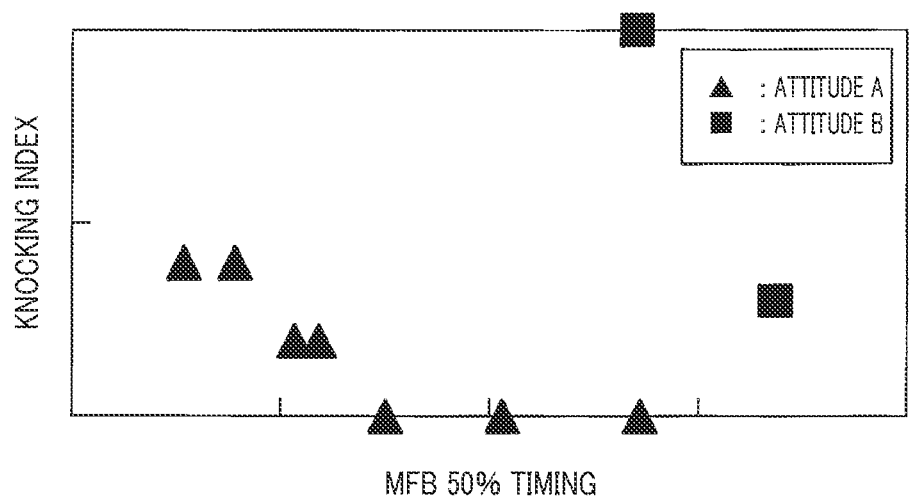
FIG. 11 is a chart of test results comparing combustion state based on attachment attitudes of the spark plug according to the first embodiment.

Results of the tests are shown in FIG. 11. In FIG. 11, a horizontal axis indicates the MFB 50% timing. The MFB 50% timing is closer to the upper dead point, that is, the advancing side toward a left side. That is, the center of gravity of combustion is further toward the advancing side, toward the left side. A vertical axis is a knocking index. Knocking frequency increases toward an upper side.

As shown in FIG. 11, whereas the knocking frequency increases while the center of gravity of combustion is relatively lagging in the attitude B, the knocking frequency does not increase even when the center of gravity of combustion advances in the attitude A, and knocking is able to be suppressed more than in the attitude B. Based on this experiment result, it is clear that improvement in fuel efficiency is more easily obtained by the attitude A than the attitude B, as considered above.

In addition, this indicates that the improvement in fuel efficiency can be obtained by the orientations of the injection holes 51 relative to the main combustion chamber 11, viewed from the axial direction Z, being controlled.

Furthermore, the appropriate orientations of the injection holes 51 change depending on the shape of the main combustion chamber 11, and the appropriate orientations of the injection holes 51 may also change depending on factors other than the shape of the main combustion chamber 11. However, in any case, the orientations of the injection holes 51 being able to be controlled when there are appropriate orientations of the injection holes 51 is clearly important as indicated by the above-described consideration and test results. Moreover, according to the spark plug 1 of the present embodiment, the positioning portion 7 is provided, and thus the orientations of the injection holes 51 relative to the main combustion chamber 11 can be controlled. As a result, improvement in fuel efficiency can be obtained.

In addition, the positioning portion 7 is configured by the fitting recessing portion 71 and the joining member 72 being fitted together. As a result, the positioning portion 7 can be easily formed.

Furthermore, the fitting recessing portion 71 is provided in the base end portion of the plug cover 5. As a result, formation of the fitting recessing portion 71 can be facilitated.

In addition, the joining member 72 is a member that configures the ground electrode. In this case, the ground electrode also functions as the joining member 72. Therefore, the positioning portion 7 can be formed without causing increase in a number of components.

As described above, according to the present embodiment, a spark plug for an internal combustion engine that is capable of obtaining improvement in fuel efficiency can be provided.

Second Embodiment

Figure 12:
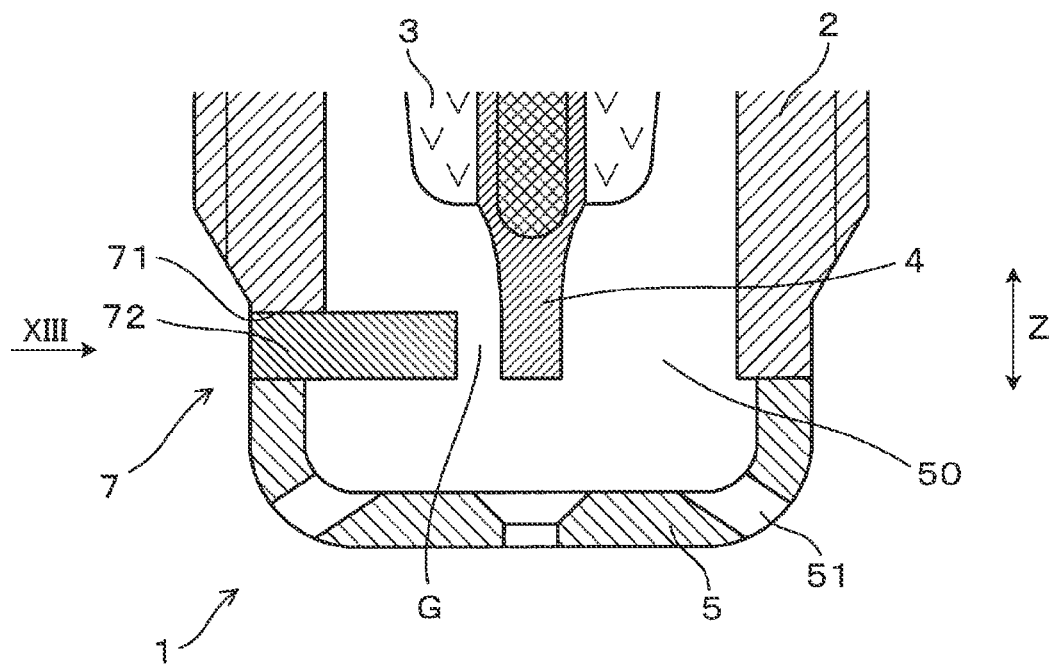
FIG. 12 is a cross-sectional view of a region around a tip end portion of a spark plug according to a second embodiment, taken along the axial direction.
Figure 13:
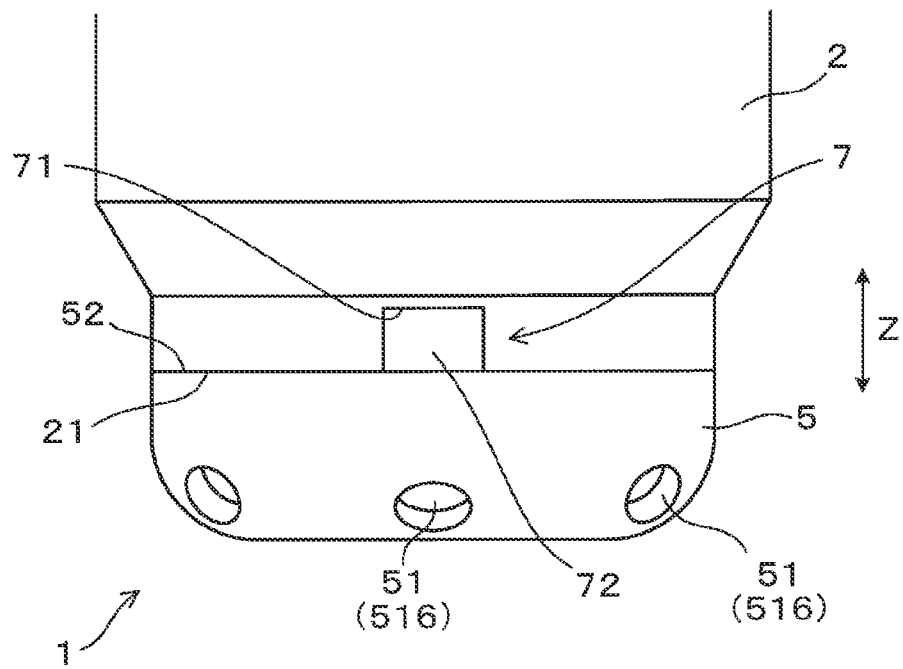
FIG. 13 is a view as viewed from an arrow XIII in FIG. 12.
Figure 14:
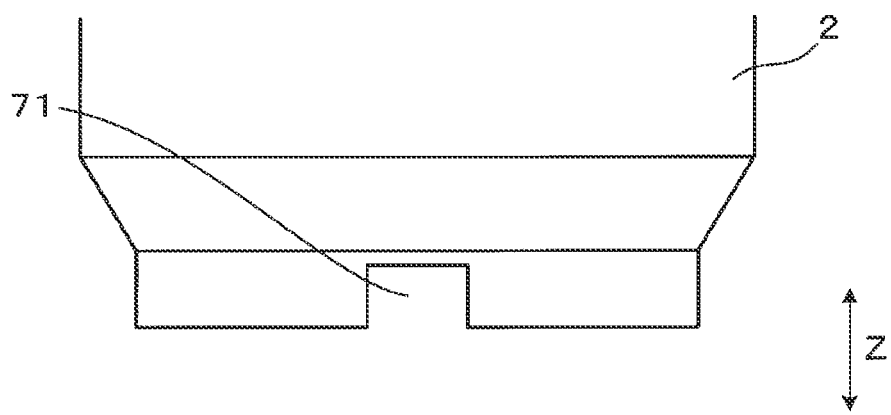
FIG. 14 is a front view of a housing and a plug cover before joining according to the second embodiment.
Figure 14:
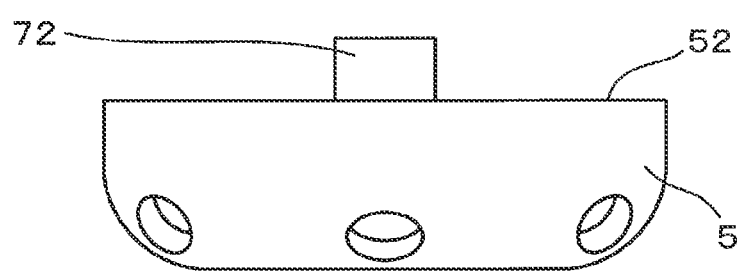

As shown in FIG. 12 to FIG. 14, a present embodiment is an embodiment of the spark plug 1 in which the fitting recessing portion 71 is provided in the tip end portion of the housing 2.

According to the present embodiment, the joining member 72 is joined to the base end portion of the plug cover 5. In addition, the positioning portion 7 is configured by the joining member 72 that is joined to the plug cover 5 and the fitting recessing portion 71 that is provided in the housing 2 being fitted together.

According to the present embodiment, in the assembly of the spark plug 1, as shown in FIG. 14, the joining member 72 is joined to the base end surface 52 of the plug cover 5 before the plug cover 5 is fixed to the housing 2. For example, joining of the joining member 72 to the plug cover 5 can be performed by resistance welding, laser welding, or the like.

Meanwhile, as shown in FIG. 14, the fitting recessing unit 71 is formed in the tip end portion of the housing 2. For example, the fitting recessing portion 71 can be formed by cutting or the like. The fitting recessing portion 71 is open toward the tip end side and open toward both sides in the plug radial direction.

In addition, as shown in FIG. 13, the base end surface 52 of the plug cover 5 is placed in contact with the tip end surface 21 of the housing 2. At this time, the overall circumference of the base end surface 52 of the plug cover 5, excluding the portion in which the fitting recessing portion 71 is formed, is placed in contact with the tip end surface 21 of the housing 2. Then, the fitting recessing portion 71 is fitted to the joining member 72. In this state, the contact portions between the base end portion of the plug cover 5 and the tip end portion of the housing 2 are joined by welding or the like. Furthermore, the joining member 72 and the inner surface of the fitting recessing portion 71 can be joined.

Other configurations are similar to those according to the first embodiment. Here, reference numbers used according to the second and subsequent embodiments that are the same as the reference numbers used according to earlier embodiments indicate constituent elements and the like that are similar to those according to the earlier embodiments, unless otherwise stated.

According to the present embodiment, the joining member 72 that serves as the ground electrode is more easily provided in a position that is further toward the base end side in the pre-combustion chamber 50. Therefore, the position of the discharge gap G can be more easily provided in a position that is further towards the base end side in the pre-combustion chamber 50. Therefore, after an initial flame that is generated near the discharge gap G is grown inside the pre-combustion chamber 50, the flame can be injected from the injection holes 51. As a result, the flame jets from the injection holes 51 toward the main combustion chamber 11 can be strengthened.

In addition, working effects similar to those according to the first embodiment are obtained.

Third Embodiment

As shown in FIG. 15 to FIG. 18, a present embodiment is an embodiment in which the fitting recessing portion 71 is provided in both the tip end portion of the housing 2 and the base end portion of the plug cover 5.

In addition, the joining member 72 is fitted to both the fitting recessing portion 71 in the housing 2 and the fitting recessing portion 71 in the plug cover 5.

Figure 15:
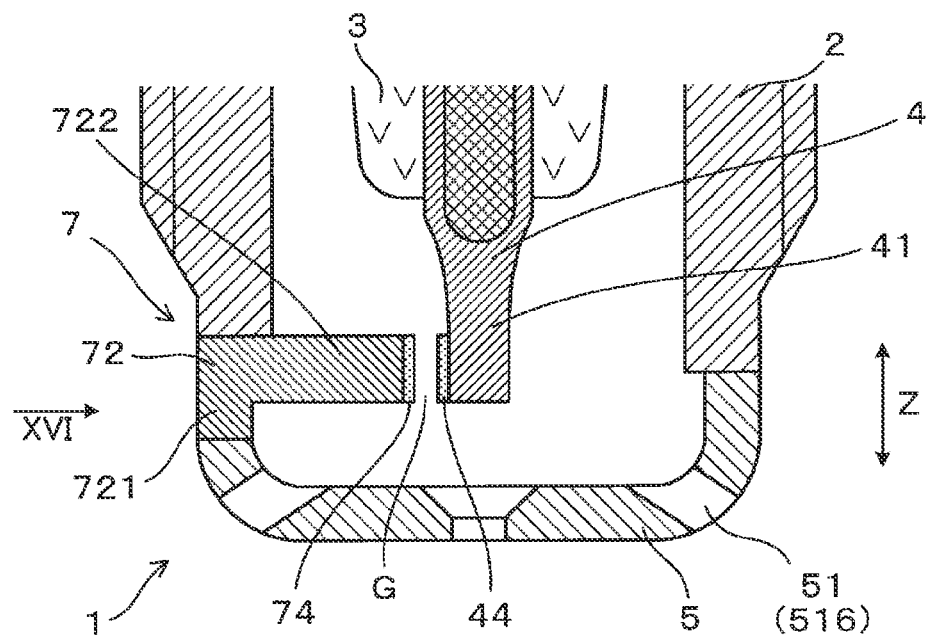
FIG. 15 is a cross-sectional view of a region around a tip end portion of a spark plug according to a third embodiment, taken along the axial direction.
Figure 18:
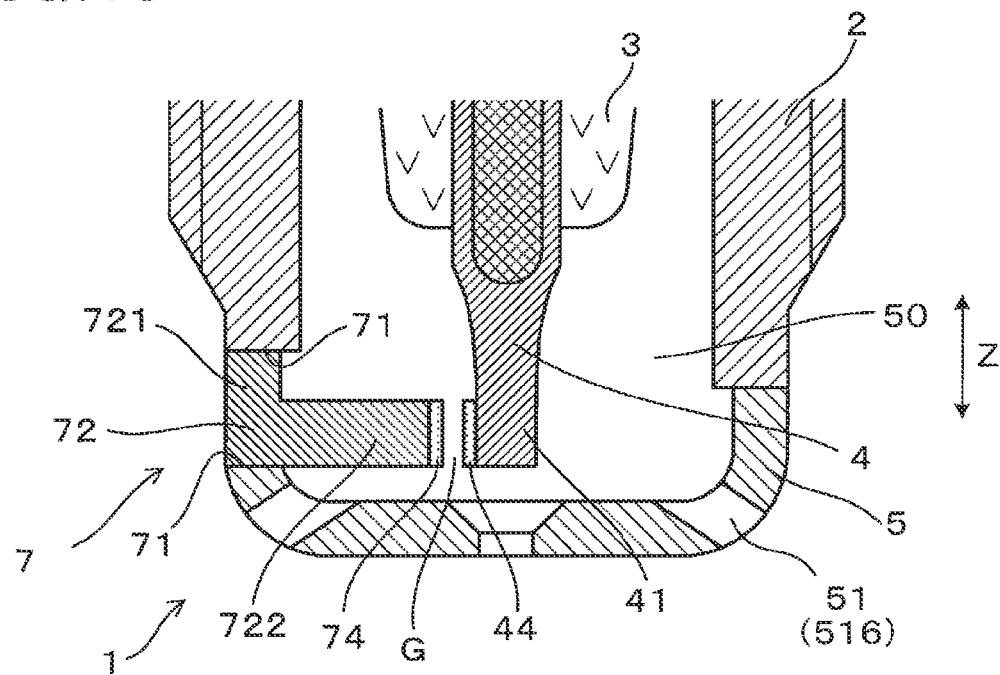
FIG. 18 is a cross-sectional view of a region around the tip end portion of the spark plug in a modification according to the third embodiment, taken along the axial direction.

Furthermore, according to the present embodiment, as shown in FIG. 15, a shape of the joining member 72 is substantially L-shaped. That is, the joining member 72 has a fitting portion 721 that is fitted into the fitting recessing portion 71 and an inner protruding portion 722 that protrudes toward the center electrode 4 side from the fitting portion 721. In a configuration shown in FIG. 15, the inner protruding portion 722 protrudes toward the center electrode 4 side from a portion on the base end side of the fitting portion 721. However, as shown in FIG. 18, a configuration in which the inner protruding portion 722 protrudes toward the center electrode 4 side from a portion on the tip end side of the fitting portion 721 is also possible.

In addition, according to the present embodiment, the joining member 72 and the center electrode 4 are both provided with noble metal tips 74 and 44 in positions that face the discharge gap G.

Figure 17:
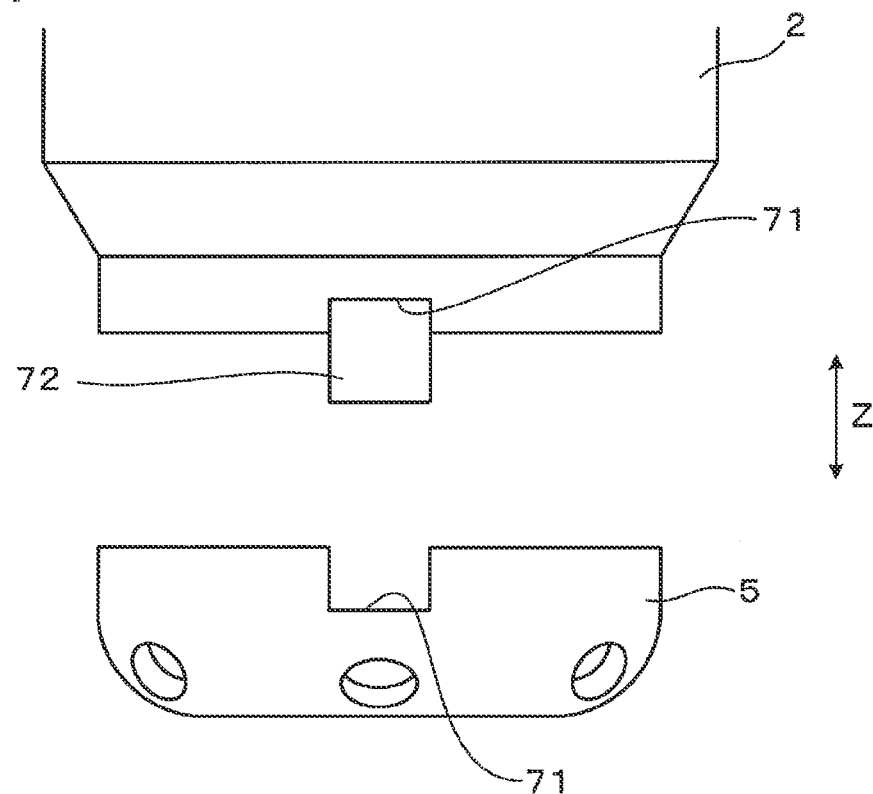
FIG. 17 is a front view of a housing and a plug cover before joining according to the third embodiment.

According to the present embodiment, in the assembly of the spark plug 1, as shown in FIG. 17, the fitting recessing portions 71 are formed in both of the tip end portion of the housing 2 and the base end portion of the plug cover 5, before the plug cover 5 is fixed to the housing 2. Then, the joining member 72 is fitted into the fitting recessing portion 71 of the housing 2 and joined.

Figure 16:
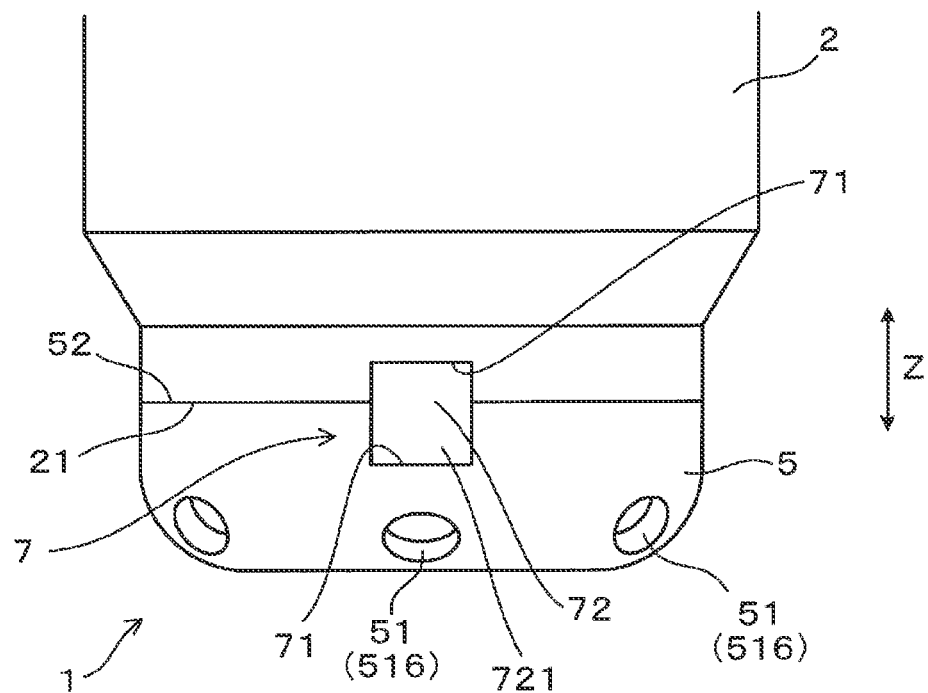
FIG. 16 a view as viewed from an arrow XVI in FIG. 15.

In addition, as shown in FIG. 16, the base end surface 52 of the plug cover 5 is placed in contact with the tip end surface 21 of the housing 2. Then, the fitting recessing portion 71 of the plug cover 5 is fitted to the joining member 72. In this state, the contact portions between the base end portion of the plug cover 5 and the tip end portion of the housing 2 are joined by welding or the like. Furthermore, the joining member 72 and the inner surface of the fitting recessing portion 71 can also be joined.

Here, the above-described assembly steps are described for a case in which the joining member 72 is fitted into the fitting recessing portion 71 of the housing 2 first. However, the joining member 72 can be fitted into the fitting recessing portion 71 of the plug cover 5 first.

Other configurations are similar to those according to the first embodiment.

According to the present embodiment, the joining member 72 is fitted to both of the fitting recessing portion 71 in the housing 2 and the fitting recessing portion 71 in the plug cover 5. Therefore, position shifting between the housing 2 and the plug cover 5 in the plug circumferential direction can be prevented with further certainty.

In addition, because the fitting portion 721 of the joining member 72 can be easily elongated in the axial direction Z, a position of the inner protruding portion 722 relative to the pre-combustion chamber 50 in the axial direction Z can be easily adjusted. Therefore, the position of the discharge gap G can be easily adjusted. That is, for example, as shown in FIG. 15, when the inner protruding portion 722 is made to protrude from the base end portion of the fitting portion 721, the discharge gap G can be formed in a position far from the injection holes 51. Meanwhile, for example, as shown in FIG. 18, when the inner protruding portion 722 is made to protrude from the tip end portion of the fitting portion 721, the discharge gap G can be formed in a position near the injection holes 51.

In the former case, flame growth can be promoted in the pre-combustion chamber 50 and the flame jets from the injection holes 51 can be more easily strengthened. In the latter case, extension of discharge in the discharge gap G can be promoted by an air flow that passes through the injection hole 51. In this manner, the position of the discharge gap G in the axial direction Z can be adjusted based on desired performance and the like.

In addition, working effects similar to those according to the first embodiment are obtained.

Here, although not shown, as the shape of the joining member 72, a shape in which the inner protruding portion 722 protrudes toward the center electrode 4 side from a portion that is midway between the base end portion and the tip end portion of the fitting portion 721 is also possible.

Fourth Embodiment

Figure 19:
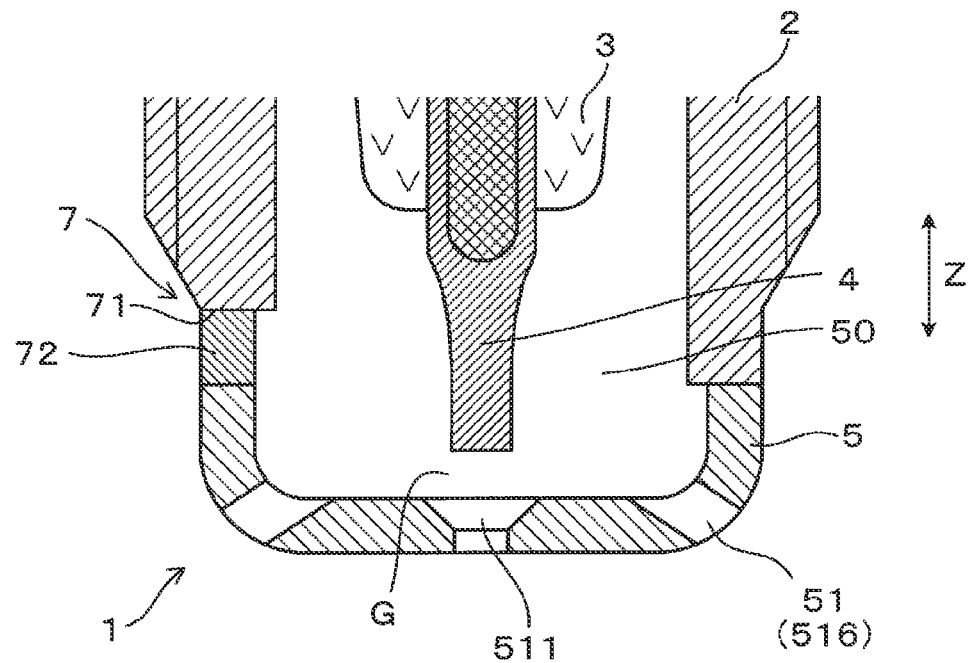
FIG. 19 is a cross-sectional view of a region around a tip end portion of a spark plug according to a fourth embodiment, taken along the axial direction.

As shown in FIG. 19, a present embodiment is an embodiment in which the joining member 72 is not particularly provided with the function of a ground electrode.

According to the present embodiment, a length of the joining member 72 in the plug radial direction is essentially equivalent to a thickness of the plug cover 5. That is, unlike that according to the first embodiment (see FIG. 1), the joining member 72 does not essentially protrude into the pre-combustion chamber 50.

According to the present embodiment, the positioning portion 7 is formed by the fitting recessing portion 71 that is provided in the plug cover 5 and the joining member 72 that is joined to the housing 2.

According to the present embodiment, the discharge gap G is formed between the center electrode 4 and a portion of the plug cover 5. Specifically, a portion on an inner circumferential edge of the axial-direction injection hole 511 in the plug cover 5 opposes a tip end of the center electrode 4. Then, the discharge gap G is formed between the portion of the inner circumferential edge of the axial-direction injection hole 511 and the tip end of the center electrode 4. Therefore, a portion of the inner circumferential edge of the axial-direction injection hole 511 serves a role as the ground electrode.

Other configurations are similar to those according to the first embodiment. In the case according to the present embodiment as well, working effects similar to those according to the first embodiment can be obtained.

Fifth Embodiment

Figure 20:
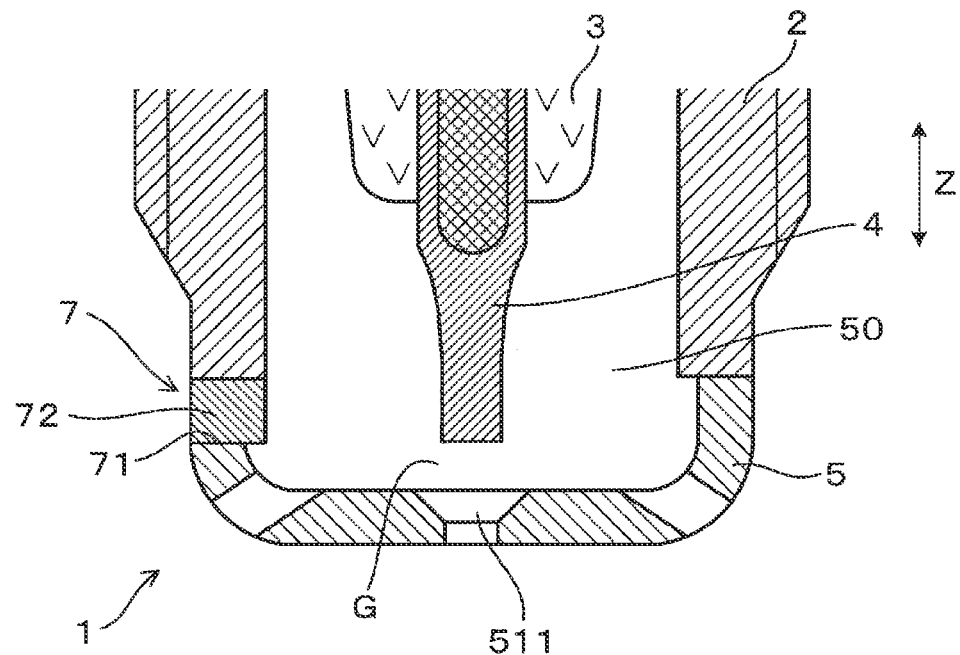
FIG. 20 is a cross-sectional view of a region around a tip end portion of a spark plug according to a fifth embodiment, taken along the axial direction.

As shown in FIG. 20, a present embodiment is also an embodiment in which the joining member 72 is not provided with the function of a ground electrode.

According to the present embodiment, the length of the joining member 72 in the plug radial direction is essentially equivalent to a thickness of the tip end portion of the housing 2. According to the present embodiment, the positioning portion 7 is formed by the fitting recessing portion 71 that is provided in the housing 2 and the joining member 72 that is joined to the plug cover 5.

Other configurations are similar to those according to the fourth embodiment. In the case according to the present embodiment as well, working effects similar to those according to the fourth embodiment can be obtained.

Sixth Embodiment

Figure 21:
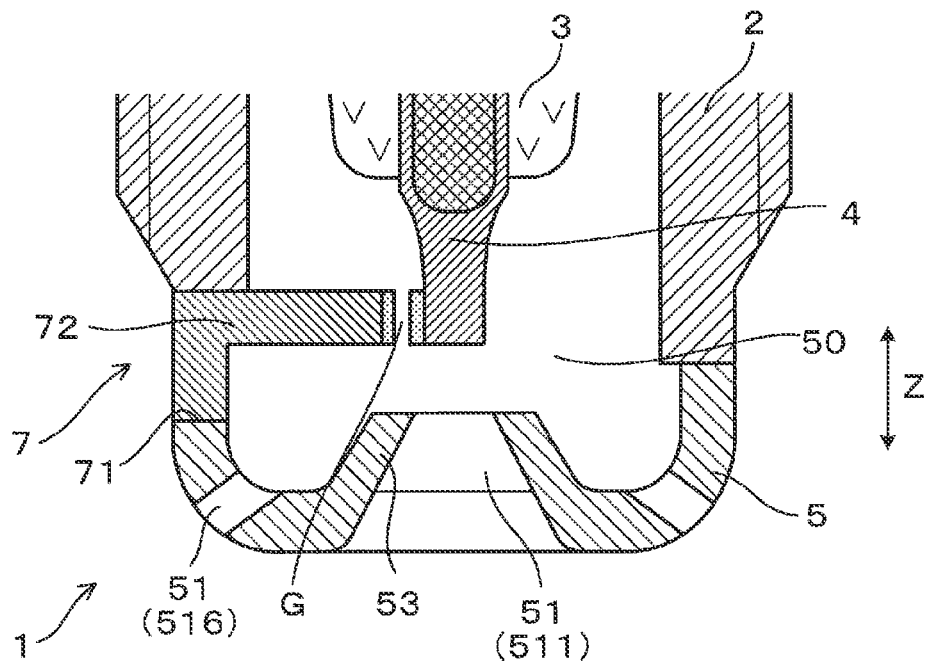
FIG. 21 is a cross-sectional view of a region around a tip end portion of a spark plug according to a sixth embodiment, taken along the axial direction.

As shown in FIG. 21, a present embodiment is an embodiment of the spark plug 1 that includes a protruding cylindrical body 53 that protrudes from the tip end of the plug cover 5 toward the pre-combustion chamber 50 side.

The protruding cylindrical body 53 has a substantially circular conical shape that decreases in diameter from the tip end side toward the base end side, and has an inner space passing therethrough in the axial direction Z. The inner space on the inner side of the protruding cylindrical body 53 communicates with the axial-direction injection hole 511.

Other configurations are similar to those according to the third embodiment.

According to the present embodiment, stretching of the discharge can be more easily promoted while the flame jets from the injection holes 51 are strengthened.

In addition, working effects similar to those according to the third embodiment are obtained.

Seventh Embodiment

Figure 22:
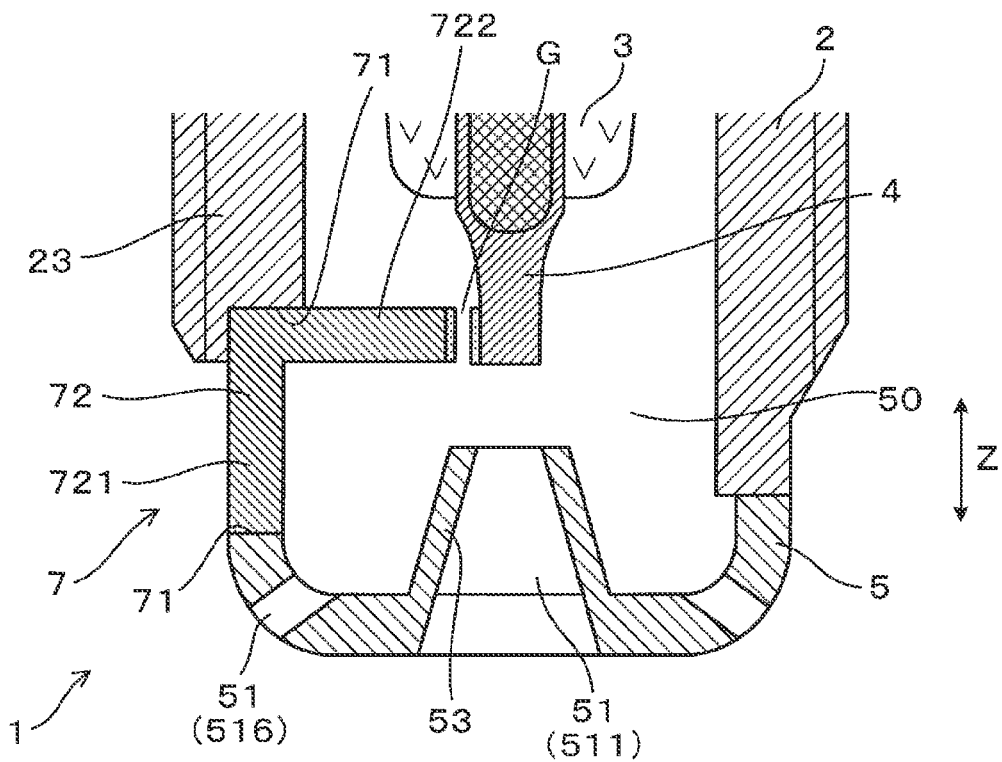
FIG. 22 is a cross-sectional view of a region around a tip end portion of a spark plug according to a seventh embodiment, taken along the axial direction.

As shown in FIG. 22, a present embodiment is an embodiment in which the fitting recessing portion 71 that is provided in the housing 2 is formed to reach a position in a portion in the axial direction Z in which the attachment screw portion 23 is formed.

That is, a portion of the fitting recessing portion 71 is formed in a position on the inner circumferential side of a portion on the tip end side of the attachment screw portion 23.

Other configurations are similar to those according to the sixth embodiment.

According to the present embodiment, the joining member 72 can be arranged in a position that is further toward the base end side in the pre-combustion chamber 50. Therefore, the discharge gap G can be formed in a position that is further toward the base end side. As a result, the flame jets from the injection holes 51 can be further strengthened.

In addition, working effects similar to those according to the sixth embodiment are obtained.

Eighth Embodiment

Figure 23:
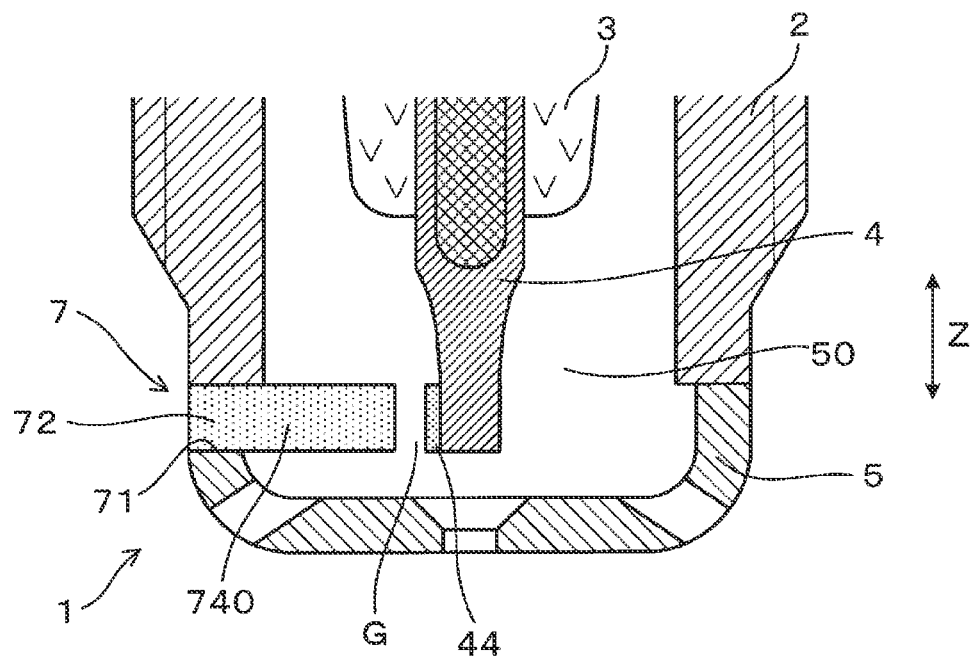
FIG. 23 is a cross-sectional view of a spark plug in which a joining member is made of a noble metal according to an eighth embodiment.

As shown in FIG. 23, a present embodiment is an embodiment in which the joining member 72 is made of a noble metal 740.

The joining member 72 that also functions as the ground electrode is made of the noble metal 740, and thus durability against wear due to discharge can be improved.

For example, a metal, such as platinum or iridium, or an alloy can be used as the noble metal.

In a configuration shown in FIG. 23, a noble metal tip 44 is provided in the center electrode 4 in a portion that faces the discharge gap G.

Figure 24:
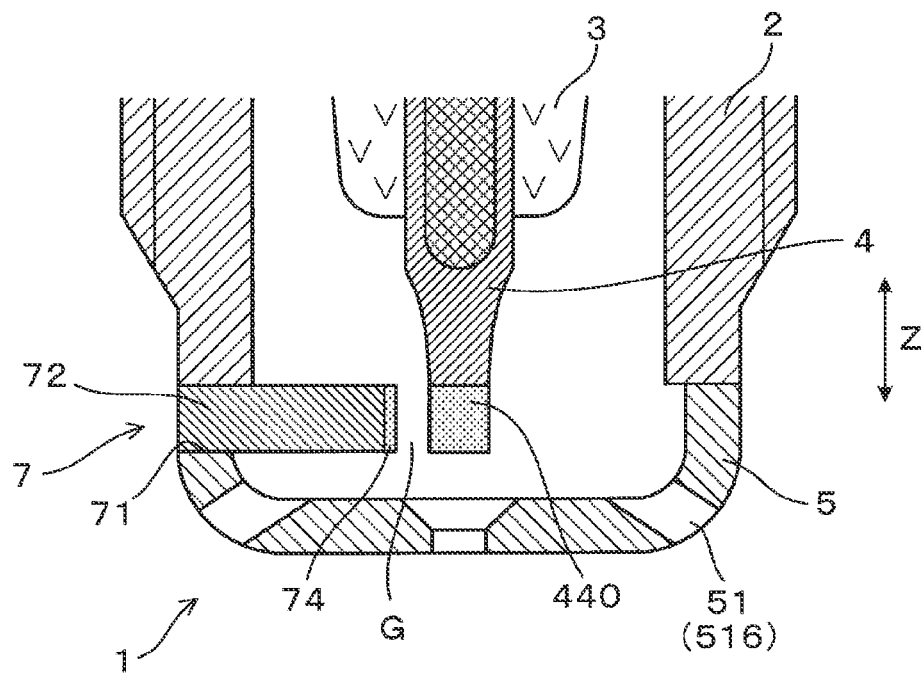
FIG. 24 is a cross-sectional view of a spark plug in which a tip end portion of a center electrode is made of a noble metal according to the eighth embodiment.

In addition, as shown in FIG. 24, a noble metal tip 74 can also be arranged in the joining member 72 in a portion that faces the discharge gap G. Furthermore, as shown in FIG. 24, a predetermined length of the tip end portion of the center electrode 4 can be made of the noble metal 440.

Figure 25:
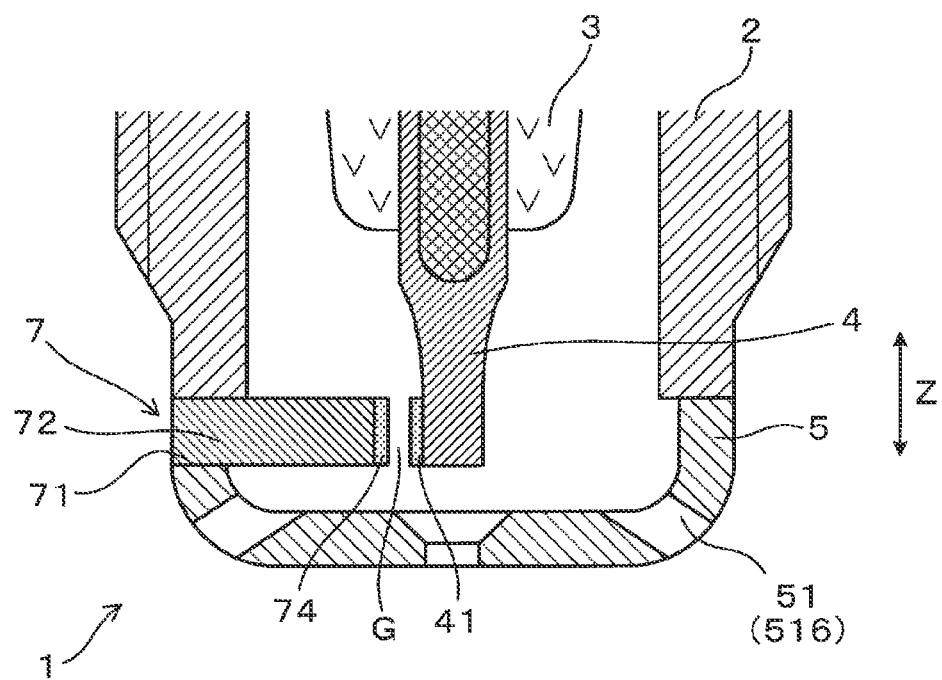
FIG. 25 is a cross-sectional view of a spark plug in which noble metal tips are provided in the center electrode and the joining member according to the eighth embodiment.

Here, a noble metal is arranged in the portion that faces the discharge gap G, and thus the above-described effects can be obtained. Therefore, as shown in FIG. 25, the noble metal tips 74 and 44 can respectively be joined to the portions of the joining member 72 and the center electrode 4 that face the discharge gap G.

Figure 26:
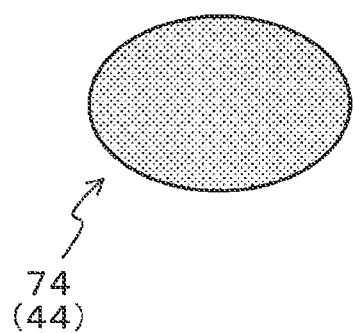
FIG. 26 is a plan view of an example of a shape of the noble metal tip according to the eighth embodiment.
Figure 27:
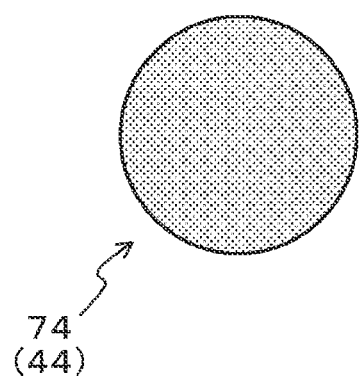
FIG. 27 is a plan view of another example of the shape of the noble metal tip according to the eighth embodiment.
Figure 28:
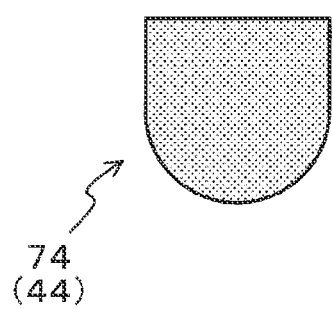
FIG. 28 is a plan view of still another example of a shape of a discharge gap according to the eighth embodiment.

In this case, as shown in FIG. 26 to FIG. 28, a shape of the noble metal tips 74 and 44 when viewed from the discharge gap G can be a shape in which an overall contour or a portion thereof is curved. In this case, wear resistance can be improved and enlargement G can be suppressed.

Although not shown, the contour of the noble metal tips 74 and 44 may be rectangular.

Other configurations and working effects are similar to those according to the first embodiment.

Ninth Embodiment

As shown in FIG. 29 to FIG. 32, a present embodiment is an embodiment in which, regarding the joining member 72 that configures the ground electrode, positions in the Z direction differ between the discharge gap G side and the fitting portion 721 side.

Figure 29:
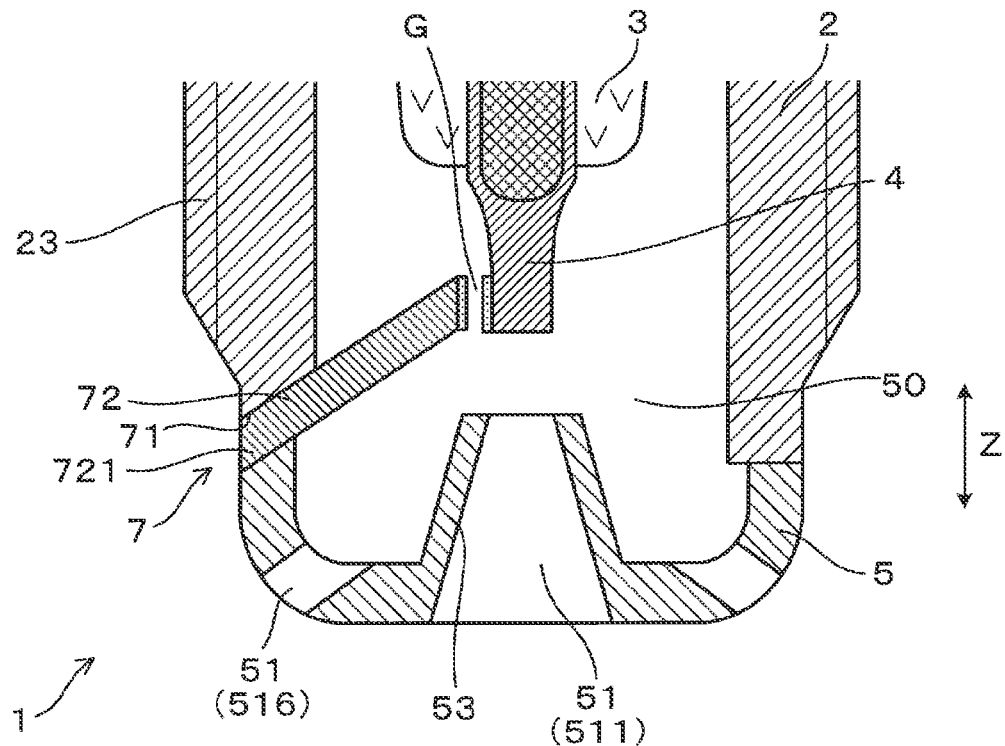
FIG. 29 is a cross-sectional view of an example of a spark plug in which a joining member is tilted according to a ninth embodiment.
Figure 30:
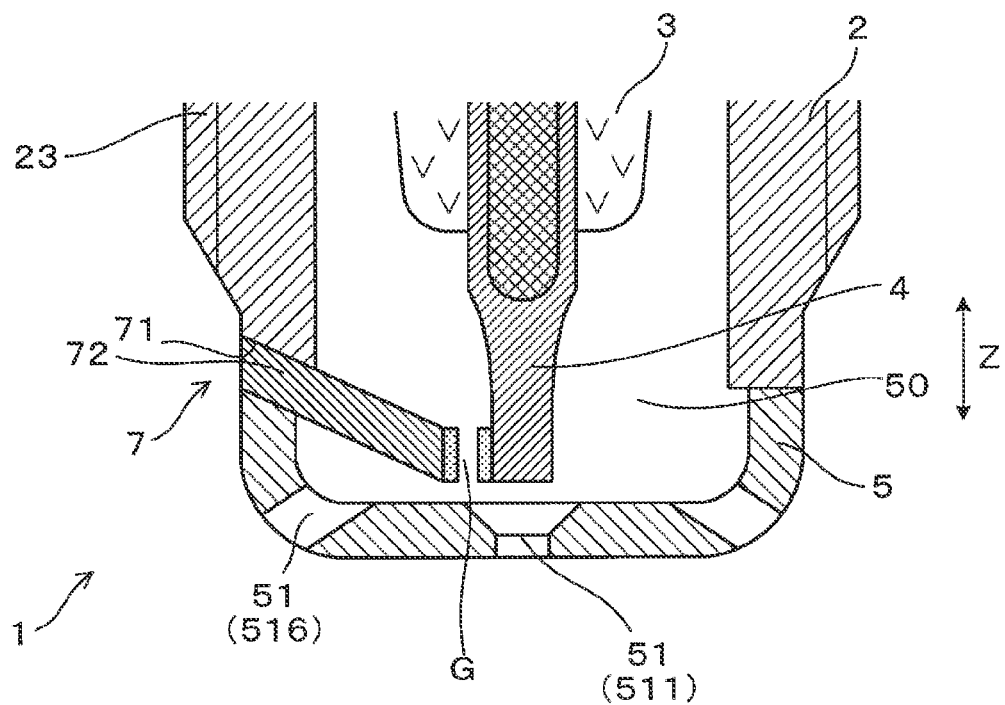
FIG. 30 is a cross-sectional view of an example of a spark plug in which the joining member is tilted according to the ninth embodiment.

That is, as shown in FIG. 29, the configuration can be such that a longitudinal direction of the joining member 72 is tilted relative to the axial direction Z and the discharge gap G side is arranged on the base end side. In addition, as shown in FIG. 30, the configuration can be such that the longitudinal direction of the joining member 72 is tilted relative to the axial direction Z and the discharge gap G side is arranged on the tip end side.

Figure 31:
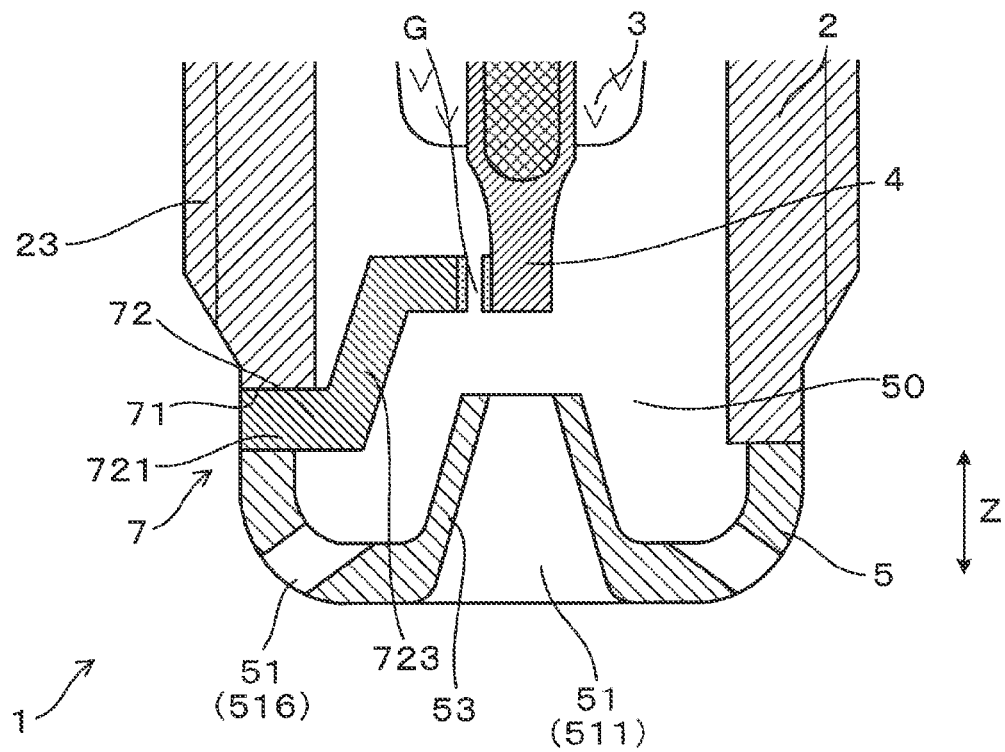
FIG. 31 is a cross-sectional view of an example of a spark plug in which the joining member is curved according to the ninth embodiment.
Figure 32:
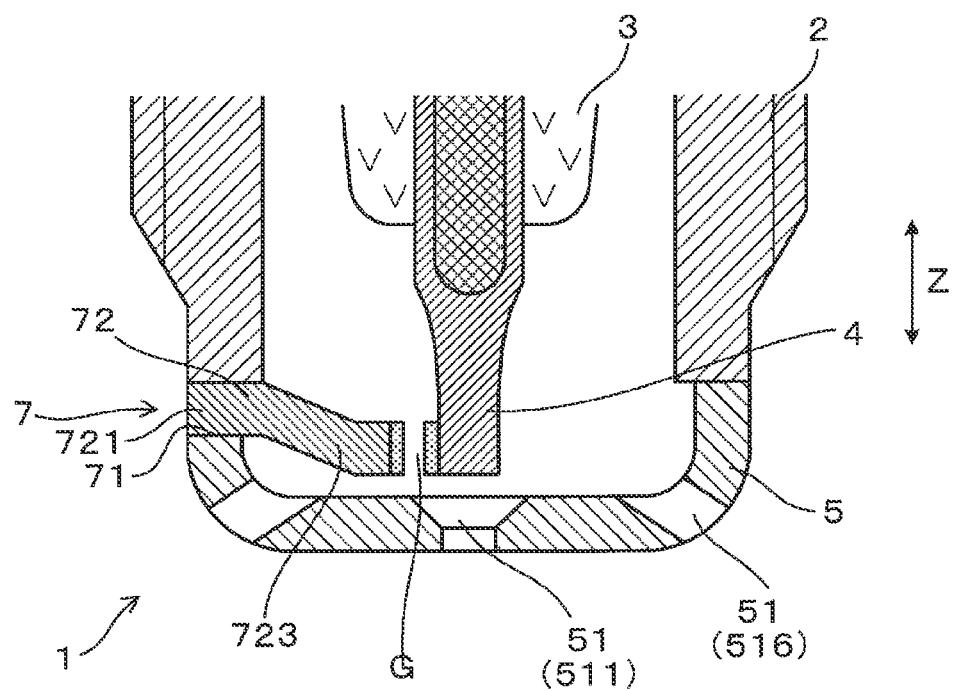
FIG. 32 is a cross-sectional view of an example of a spark plug in which the joining member is curved according to the ninth embodiment.

Furthermore, as shown in FIG. 31 and FIG. 32, the configuration can be such that the joining member 72 is bent. That is, a relay portion 723 between the fitting portion 721 and the end portion on the discharge gap G side of the joining member 72 can be configured to be bent toward the base end side or the tip end side relative to the fitting portion 721.

Other configurations are similar to those according to the eighth embodiment.

According to the present embodiment as well, the position of the discharge gap G in the axial direction Z can be easily adjusted based on desired performance and the like.

In addition, working effects similar to those according to the first embodiment are obtained.

Tenth Embodiment

Figure 33:
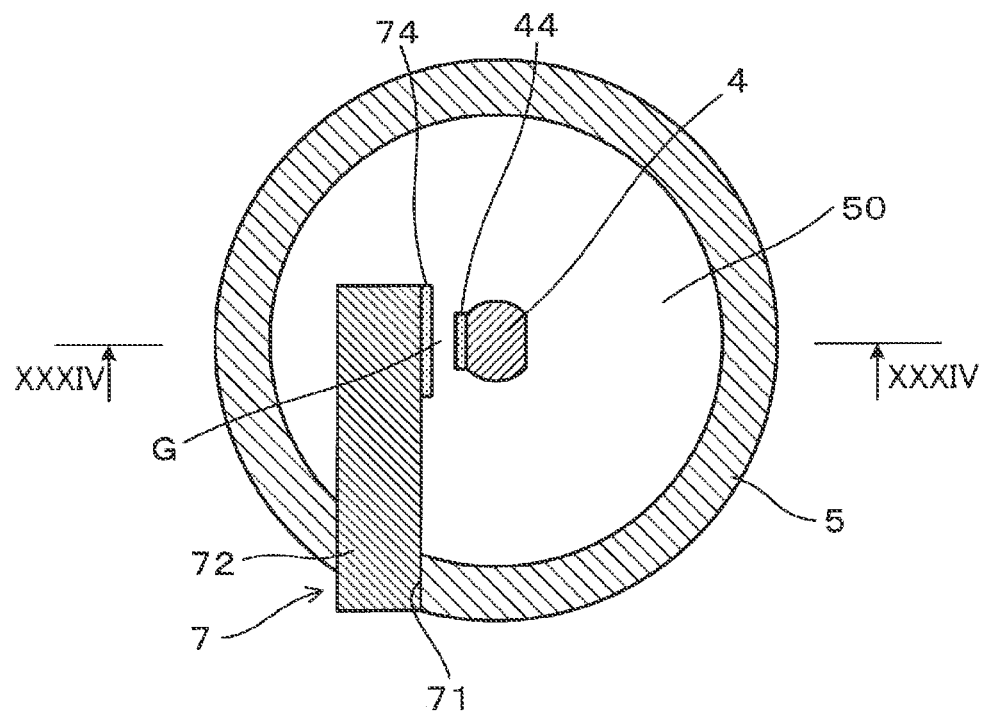
FIG. 33 is a cross-sectional view of a spark plug according to a tenth embodiment and a cross-sectional view as viewed from arrows XXXIII-XXXIII in FIG. 34.
Figure 34:
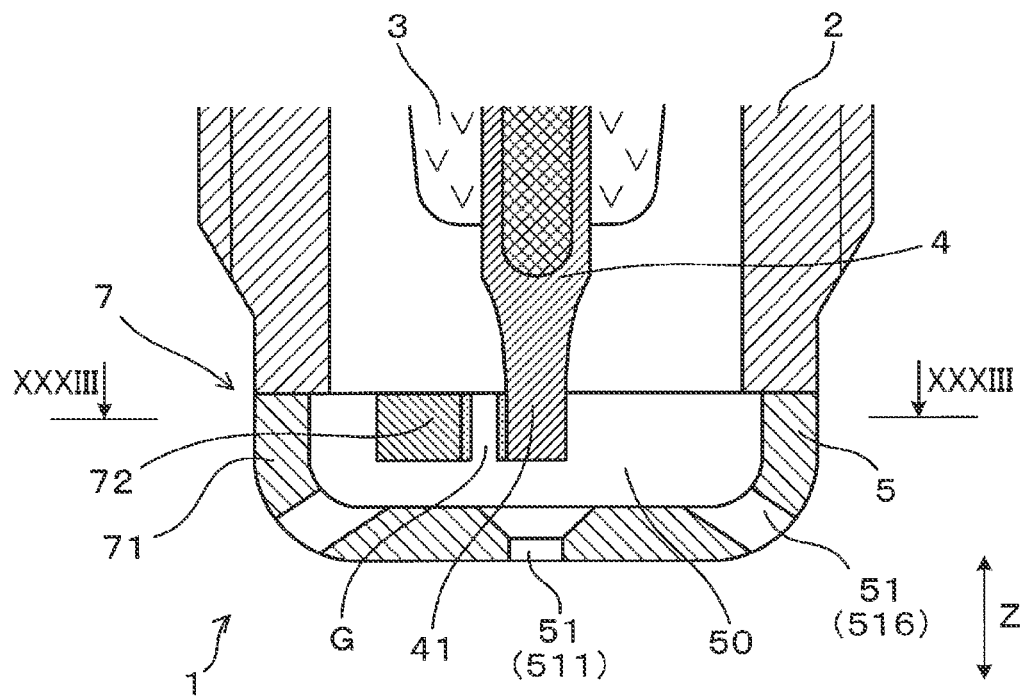
FIG. 34 is a cross-sectional view of the spark plug according to the tenth embodiment and a cross-sectional view as viewed from arrows XXXIV-XXXIV in FIG. 33.

As shown in FIG. 33 and FIG. 34, a present embodiment is an embodiment in which the longitudinal direction of the joining member 72 that configures the ground electrode is a direction that is orthogonal to the axial direction Z and a direction that differs from the plug radial direction.

That is, the longitudinal direction of the joining member 72 is a direction that is orthogonal to the axial direction Z and a direction that is also orthogonal to an opposing direction between the center electrode 4 and the ground electrode with the discharge gap G therebetween.

According to the present embodiment, the joining member 72 is joined to the tip end portion of the housing 2 and fitted to the fitting recessing portion 71 that is formed in the plug cover 5.

Other configurations are similar to those according to the first embodiment.

According to the present embodiment, a discharge surface can be provided on a surface of the joining member 72 that is orthogonal to the longitudinal direction. Therefore, a discharge area can be easily increased and increased life can be obtained. In addition, even if an amount of protrusion of the joining member 72 into the pre-combustion chamber 50 slightly varies, the size of the discharge gap G can be kept from changing. Consequently, management of the discharge gap G can be facilitated.

Furthermore, working effects similar to those according to the first embodiment are obtained.

Figure 35:
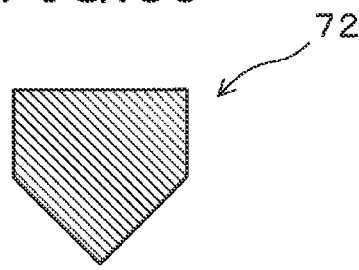
FIG. 35 is a cross-sectional view of an example of a cross-sectional shape of a joining member, orthogonal to a longitudinal direction thereof.
Figure 36:
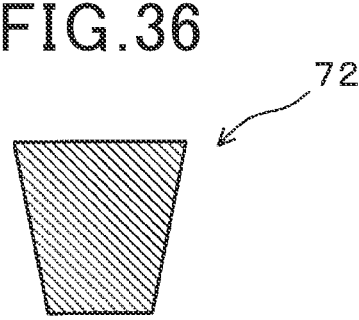
FIG. 36 is a cross-sectional view of another example of the cross-sectional shape of the joining member, orthogonal to the longitudinal direction thereof.
Figure 37:
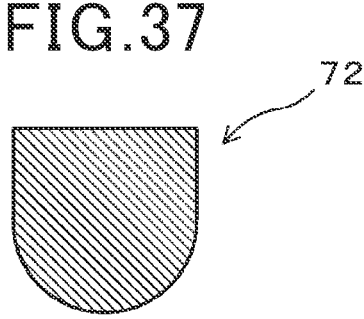
FIG. 37 is a cross-sectional view of yet another example of the cross-sectional shape of the joining member, orthogonal to the longitudinal direction thereof.

In addition to the above-described embodiments, various embodiments can be considered. Regarding the shape of the joining member 72 as well, various shapes can be considered. As a cross-sectional shape that is orthogonal to the longitudinal direction of the joining member 72, in addition to a rectangular shape, various shapes such as a pentagonal shape as shown in FIG. 35, a trapezoidal shape as shown in FIG. 36, a curved contour shape as shown in FIG. 37 can be considered. In the case of the shapes shown in FIG. 35 and FIG. 36, for example, when a discharge is generated in an expansion stroke of the internal combustion engine, the discharge can be easily stabilized. In addition, in the case of the shape shown in FIG. 37, a specific surface area of the joining member 72 can be reduced, and increase in temperature can be easily prevented. Therefore, occurrence of preignition can be easily suppressed.

Furthermore, a positioning portion can be formed without use of the joining member 72. For example, the positioning portion can be configured by a protruding portion and a recessing portion that are respectively provided in one and the other of the housing and the plug cover being engaged with each other.

The present disclosure is not limited to the above-described embodiments and can be applied to various embodiments without departing from the spirit of the invention.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A spark plug for an internal combustion engine, the spark plug comprising:
    a cylindrical insulator;
    a center electrode that is held on an inner circumferential side of the insulator and includes a tip-end protruding portion that protrudes from the insulator toward a tip end side;
    a cylindrical housing that holds the insulator on an inner circumferential side; and
    a plug cover that is provided in a tip end portion of the housing so as to cover a pre-combustion chamber in which the tip-end protruding portion is arranged, wherein
    the plug cover is provided with an injection hole that communicates the pre-combustion chamber to the outside, and
    a positioning portion that performs positioning of the housing and the plug cover in a plug circumferential direction is provided in the housing and the plug cover.

2. The spark plug for an internal combustion engine according to claim 1, wherein:
    the positioning portion is configured by a fitting recessing portion that is provided in at least either of the tip end portion of the housing and a base end portion of the plug cover, and a joining member that is joined to a component, of the housing and the plug cover, on a side opposite a component in which the fitting recessing portion is provided being fitted together.

3. The spark plug for an internal combustion engine according to claim 2, wherein:
    the joining member is a member that configures a ground electrode.

4. The spark plug for an internal combustion engine according to claim 2, wherein:
    the fitting recessing portion is provided in the base end portion of the plug cover.

5. The spark plug for an internal combustion engine according to claim 3, wherein:
the fitting recessing portion is provided in the base end portion of the plug cover.

6. The spark plug for an internal combustion engine according to claim 3, wherein:
the fitting recessing portion is provided in the tip end portion of the housing.

7. The spark plug for an internal combustion engine according to claim 2, wherein:
the fitting recessing portion is provided in both of the tip end portion of the housing and the base end portion of the plug cover, and the joining member is fitted to both of the fitting recessing portion in the housing and the fitting recessing portion in the plug cover.

8. The spark plug for an internal combustion engine according to claim 3, wherein:
the fitting recessing portion is provided in both of the tip end portion of the housing and the base end portion of the plug cover, and the joining member is fitted to both of the fitting recessing portion in the housing and the fitting recessing portion in the plug cover.

9. The spark plug for an internal combustion engine according to claim 4, wherein:
the fitting recessing portion is provided in both of the tip end portion of the housing and the base end portion of the plug cover, and the joining member is fitted to both of the fitting recessing portion in the housing and the fitting recessing portion in the plug cover.

10. The spark plug for an internal combustion engine according to claim 5, wherein:
the fitting recessing portion is provided in both of the tip end portion of the housing and the base end portion of the plug cover, and the joining member is fitted to both of the fitting recessing portion in the housing and the fitting recessing portion in the plug cover.

11. The spark plug for an internal combustion engine according to claim 6, wherein:
the fitting recessing portion is provided in both of the tip end portion of the housing and the base end portion of the plug cover, and the joining member is fitted to both of the fitting recessing portion in the housing and the fitting recessing portion in the plug cover.

* * * * *